United States Patent [19]
Brailean et al.

[11] Patent Number: 5,872,777
[45] Date of Patent: Feb. 16, 1999

[54] METHOD AND APPARATUS FOR CONVEYING DATA PACKETS IN A PACKET DATA COMMUNICATION SYSTEM

[75] Inventors: Karen A. Brailean, Park Ridge; Robert F. Boxall, Morton Grove, both of Ill.

[73] Assignee: Motorola, Inc., Schaumburg, Ill.

[21] Appl. No.: 940,300

[22] Filed: Sep. 30, 1997

[51] Int. Cl.[6] .............................. H04L 1/16; H04L 12/56; G03F 11/00
[52] U.S. Cl. .......................... 370/349; 370/437; 371/33; 395/182.16
[58] Field of Search .................................... 370/216, 231, 370/328, 349, 437; 371/32, 33, 34; 395/200.62, 180, 181, 182.16

[56] References Cited

U.S. PATENT DOCUMENTS

| | | | |
|---|---|---|---|
| 4,905,234 | 2/1990 | Childress et al. | 370/349 |
| 5,245,616 | 9/1993 | Olson | 371/32 |
| 5,440,545 | 8/1995 | Buchholz et al. | 370/426 |
| 5,487,068 | 1/1996 | Smolinske et al. | 370/450 |
| 5,570,376 | 10/1996 | Ayanoglu et al. | 370/436 |
| 5,754,754 | 5/1998 | Duddley et al. | 395/182.16 |

*Primary Examiner*—Hassan Kizou
*Attorney, Agent, or Firm*—Daniel C. Crilly

[57] ABSTRACT

A packet data communication system (100) employs a method and apparatus for conveying data packets in the packet data communication system. A first communication device (101) transmits, at a first time, a first group of data packets and, at a second time prior to receiving an acknowledgment of receipt of the first group, a second group of data packets to a second communication device (105). Each data packet of the two groups includes a respective packet sequence number and the second group includes at least some data packets of the first group. The first communication device stores in memory the packet sequence numbers of the data packets in each group together with a group identifier for their respective group. Upon receiving the first group, the second group, or both, the second communication device transmits an acknowledgment of receipt of at least one of the groups, wherein the acknowledgment includes at least a receive tracking number. Upon receiving the acknowledgment, the first communication device determines which group of data packets the received acknowledgment corresponds to based at least on the receive tracking number. The first communication device then transmits a third group of data packets to the second communication device based on which group the acknowledgment corresponds to.

12 Claims, 3 Drawing Sheets

METHOD AND APPARATUS FOR CONVEYING DATA PACKETS IN A PACKET DATA COMMUNICATION SYSTEM

CROSS-REFERENCE TO RELATED APPLICATIONS

This application is related to U.S. patent application Ser. No. 08/940,299 entitled "Method and Apparatus For Tracking Data Packets In A Packet Data Communication System", filed on an even date herewith, and assigned to the assignee of the instant invention.

FIELD OF THE INVENTION

The present invention relates generally to communication systems and, in particular, to conveying groups of data packets between communication devices in a packet data communication system.

BACKGROUND OF THE INVENTION

Packet data communication systems are known in both the wireless and wireline environments. In the wireless environment, a packet data system includes packet data routers, data controllers, base stations, and wireless communication units (e.g., mobile radios, portable radios, radiotelephones, or wireless data terminals). In the wireline environment, a packet data system includes switches and wireline communication devices (e.g., personal computers, computer servers, mainframes, laptop computers, personal communication devices, or custom data terminals). Packet data communications are also known to exist between wireless and wireline systems.

Packet data systems typically provide for transmission of data packets either individually or in groups otherwise known as "bundles." In systems that provide for individual packet transmission, such as transport control protocol (TCP) systems, the sending device transmits one packet at a time and receives a corresponding acknowledgment for each packet from the receiving device. Each data packet includes a packet sequence number that allows the receiving device to determine which packet it has received. Knowing the packet sequence number of the received packet, the receiving device transmits an acknowledgment indicating the packet sequence number of the packet that was received. In systems that provide for the use of selective automatic repeat request (SARQ) protocols, the data packet is typically subdivided into data blocks, wherein each data block has an associated data block number. In such SARQ systems, the acknowledgment typically includes the packet sequence number and the data block numbers of the data blocks that were not completely received by the receiving device. Thus, in SARQ systems, the sending device need only retransmit the unreceived data blocks instead of the entire data packet.

In systems that provide for group packet transmissions, the sending device transmits a group of data packets and receives a single acknowledgment for the group of data packets. As in single packet transmission systems, each data packet includes a packet sequence number. However, in group transmission systems, the acknowledgment includes the packet sequence number of each data packet in the group that was not completely received by the receiving device and, when an SARQ protocol is used, the data block numbers of the data blocks in each packet that were not completely received by the receiving device. To distinguish between acknowledgments for groups of data packets, the sending device typically identifies the lowest-valued packet sequence number of the group being acknowledged and compares it to the packet sequence numbers stored in a database that associates packet sequence numbers with group numbers. For example, when the sending device transmits Group 1 having packet sequence numbers 1–5, it stores the group number (1 in this case) and the packet sequence numbers (1–5 in this case) in a database. If, before receiving an acknowledgment of 1, the sending device also transmits Group 2, consisting of packet sequence numbers 6–10, and then receives the acknowledgment, the sending device examines the acknowledgment to determine which data packets are being acknowledged. Thus, if the acknowledgment indicated that data blocks 2 and 3 of the data packet having packet sequence number 4 were not received, the sending device would determine that the acknowledgment was an acknowledgment of Group 1 because packet sequence number 4 was transmitted in Group 1.

In both single packet and group packet transmission systems, acknowledgment timers are employed to set retransmission times. When an acknowledgment to a particular transmission is not received within the predetermined time of the corresponding acknowledgment timer, the sending device presumes the transmission was not received and retransmits the packet or group of packets, respectively. However, when an acknowledgment is received subsequent to the retransmission, the sending device does not know which transmission the acknowledgment actually corresponds to and presumes that the acknowledgment corresponds to the retransmission. Such a presumption may be in error due to inherent delays in the packet data system. For example, in integrated voice and data systems, voice calls typically have priority over data calls. Thus, a situation may arise whereby a receiving device receives a packet data transmission, but, before the receiving device can respond with an acknowledgment, the system preempts the device's request for allocation of a channel over which to transmit the acknowledgment due to high levels of voice traffic. As a consequence of the delay in transmitting the acknowledgment, the sending device's acknowledgment timer expires and a retransmission occurs.

By not knowing which transmission the acknowledgment actually corresponds to, the sending device, in response to the acknowledgment, might retransmit data that was already received by the receiving device (e.g., when the acknowledgment is an acknowledgment of the original transmission and indicates fewer completely received packets than were received in the retransmission). By retransmitting data that was already received, the sending device is inefficiently using a communication channel that could otherwise be used to transmit new or otherwise unreceived data.

One approach that could be used to eliminate the uncertainty in acknowledgments is to include a group identifier in each transmission and corresponding acknowledgment. By incrementing the group identifier with each transmission and retransmission, the receiving device can easily determine which group it is acknowledging. By including the group identifier in each acknowledgment, the sending device can easily determine which group is being acknowledged. However, although including a group identifier solves the aforementioned acknowledgment identification problem, it does so at the cost of reduced data throughput. Since communication channels have fixed bandwidths, adding bits to identify the transmission group would result in correspondingly fewer bits of data in each transmission, thereby reducing throughput.

Therefore, a need exists for a method and apparatus of conveying data packets in a packet data communication system that solves the acknowledgment identification problem, without reducing data throughput.

DESCRIPTION OF A PREFERRED EMBODIMENT

Generally, the present invention encompasses a method and apparatus for conveying data packets in a packet data communication system. At a first time, a first communication device transmits a first group of data packets to a second communication device, wherein each data packet of the first group includes a respective packet sequence number. The first communication device also stores the respective packet sequence number of each data packet in the first group together with a group identifier for the first group in memory. At a second time, prior to receiving an acknowledgment of receipt of the first group from the second communication device, the first communication device transmits a second group of data packets to the second communication device, wherein the second group includes at least some data packets of the first group and wherein each data packet of the second group includes a respective packet sequence number. The first communication device also stores the respective packet sequence number of each data packet in the second group together with a group identifier for the second group in memory.

Subsequent to receiving the first group, the second group, or both, the second communication device transmits an acknowledgment of receipt of at least one of the groups, wherein the acknowledgment includes at least a receive tracking number. The receive tracking number indicates the packet sequence number of a data packet of the respective group being acknowledged that is earliest in sequence in the respective group and that was not completely received by the second communication device. Upon receiving the acknowledgment, the first communication device determines which group of data packets the received acknowledgment corresponds to based at least on the receive tracking number. The first communication device then transmits a third group of data packets to the second communication device based on which group the acknowledgment corresponds to, wherein the third group includes at least a portion of a data packet of the group that the acknowledgment corresponds to that is earliest in sequence in the group and that was not completely received by the second communication device.

By conveying data packets in this manner, the present invention permits data packets to be conveyed reliably and efficiently in the presence of lengthy delays within the system, without having to include group identifiers in the group transmission and the acknowledgment to indicate which group of packets were transmitted and are being acknowledged. By eliminating the need for group identifiers in the packet transmission and the acknowledgment, the present invention improves channel throughput since additional bits otherwise used for the group identifiers can be used to convey user data.

Figure 1:
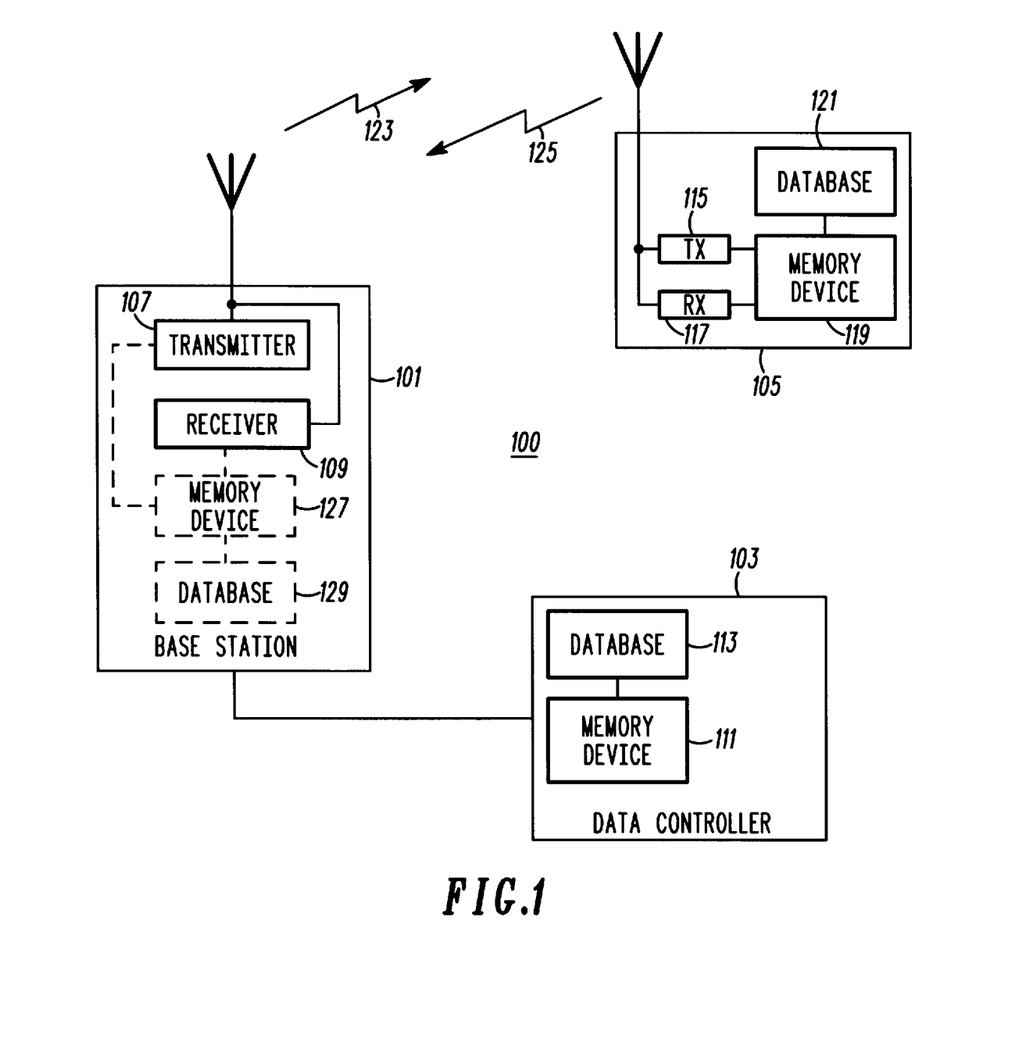
FIG. 1 illustrates a block diagram depiction of a packet data communication system in accordance with the present invention.

The present invention can be more fully understood with reference to FIGS. 1–5. FIG. 1 illustrates a block diagram depiction of a packet data communication system 100 in accordance with the present invention. The communication system 100 preferably includes a base station 101, a data controller 103, and a mobile or portable communication unit 105. The base station preferably includes a transmitter 107 and a receiver 109, and preferably comprises an "iDEN" Base Repeater (BR) manufactured by Motorola, Inc. The data controller 103 preferably includes a computer readable memory device 111 and a database 113, and preferably comprises an "iDEN" "MOTOROLA" Data Gateway (MDG), which will be commercially available from Motorola, Inc. on or about Mar. 1, 1998. The communication unit 105 includes a transmitter (TX) 115, a receiver (RX) 117, a computer readable memory device 119, and a database 121. The communication unit 105 preferably comprises a mobile or portable two-way radio or radiotelephone device, such as an "iDEN" mobile or portable radio.

The transmitters 107, 115 and receivers 109, 117 of the base station 101 and the communication unit 105 are well-known; thus, no further discussion of them will be provided. The computer readable memory devices 111, 119 of the data controller 103 and the communication unit 105 each preferably comprise a read only memory (ROM) for storing a computer program and a microprocessor to execute the stored computer program. However, in an alternative embodiment, each memory device 111, 119 might comprise another computer-readable storage medium, such as a random access memory (RAM), a programmable read only memory (PROM), a diskette, a hard disk, a PCMCIA memory card, a logic circuit, a mass storage medium, an optical disk, a CD-ROM, a magnetic disk, or a digital versatile disk (DVD). As described below, the computer programs stored in and executed by the memory devices 111, 119 perform most of the steps executed by the data controller 103 and the communication unit 105 in accordance with the present invention.

Operation of the packet data communication system 100 occurs substantially as follows in accordance with the present invention. When a sending communication device (such as the combination of the base station 101 and the data controller 103) desires to transmit one or more groups of data packets to a receiving communication device (such as communication unit 105), the sending device requests and receives a radio communication channel 123 in accordance with known channel allocation techniques. In a preferred embodiment, the radio communication channel 123 comprises one or more outbound (base station-to-communication unit) time slots of an assigned outbound carrier frequency in a time division multiple access (TDMA) communication system, such as Motorola's iDEN telecommunication system. However, in an alternative embodiment, the communication channel 123 might comprise an outbound carrier frequency in a frequency division multiple access (FDMA) communication system or an orthogonal code (whether by direct sequence or via frequency hopping) in a code division multiple access (CDMA) communication system.

Figure 2:
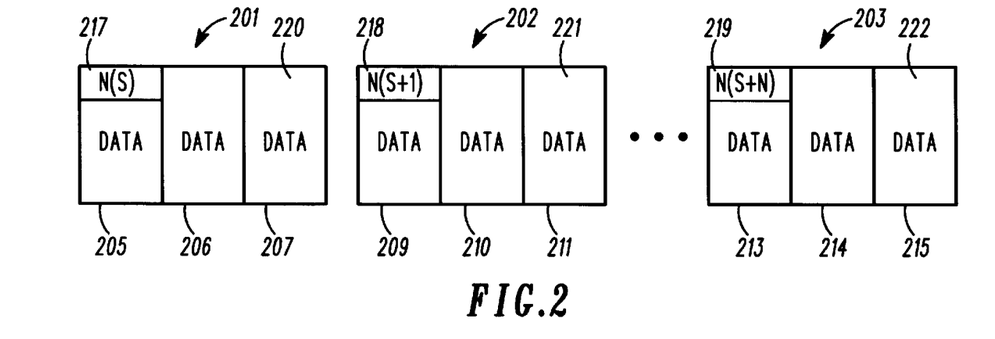
FIG. 2 illustrates an exemplary group of data packets in accordance with the present invention.

Upon receiving the channel grant, the data controller 103 configures a group of data packets, conveys the group of data packets to the base station 101, and stores a group identifier (ID) together with the packet sequence numbers of the data packets in the group in the database 113. An exemplary group of data packets 201–203 is depicted in FIG. 2. As shown, the group consists of N data packets. Each data packet in the group includes a respective packet sequence number 217–219 and corresponding data 220–222. That is, the first data packet 201 includes packet sequence number 217 (N(S)) and data 220. Similarly, the second data packet 202 includes packet sequence number 218 (N(S+1)) and data 221. Likewise, the Nth data packet 203 includes packet sequence number 219 (N(S+N)) and data 222. As also shown in FIG. 2, each data packet 217–219 is preferably partitioned into a plurality of data blocks 205–207, 209–211, 213–215 to permit use of one of several known selective automatic repeat request (SARQ) protocols. In the preferred embodiment, each packet sequence number 217–219 is included as the first portion (e.g., the first seven bits of the second byte) of the first data block 205, 209, 213 in its respective data packet 201–203. However, in an alternative embodiment, the packet sequence numbers 217–219 may be placed in any data block of their respective data packets 201–203, provided that such placement is known to both the sending and receiving communication devices.

Figure 4:
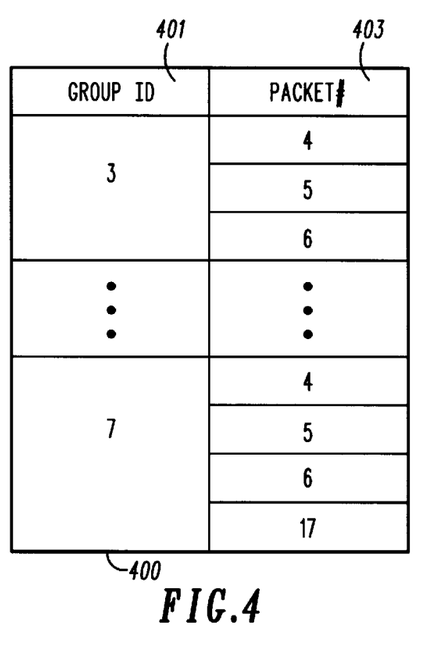
FIG. 4 illustrates an exemplary storage area of a database of a sending communication device in accordance with the present invention.

An exemplary storage area 400 of the database 113 is depicted in FIG. 4. The storage area 400 includes the group ID) 401 for transmitted groups of data packets and the corresponding packet sequence numbers 403 of the data packets in the respective groups. The data controller's use of the storage area 400 in accordance with the present invention is provided in more detail below.

After the group of data packets 201–203 is received from the data controller 103, the base station 101 employs its transmitter 107 to encode the group of data packets 201–203 and transmit the encoded group of data packets to the communication unit 105 via the allocated communication channel 123. Once the group of data packets 201–203 is transmitted, the base station 101 sends a transmission confirmation message to the data controller 103. In response to the confirmation message, the data controller 103 starts an acknowledgment timer within its memory device 119, and increases a transmit tracking number stored in the database 113 to indicate the packet sequence number of the next packet in sequence to be transmitted. For example, after the base station 101 confirms the transmission of the group of data packets 201–203 having packet sequence numbers one through three (i.e., N(S)=1, N(S+1)=2, and N(S+N)=3), the data controller 103 starts an acknowledgment timer for the group and increments the transmit tracking number to four to indicate that the data packet having packet sequence number four is next in sequence to be transmitted. The acknowledgment timer prevents the data controller 103 from waiting indefinitely for an acknowledgment before it determines to retransmit a group of data packets. In the preferred embodiment, the acknowledgment timer is set to expire within five seconds after transmission of the respective group of data packets 201–203. In an alternative embodiment, the expiration time of the acknowledgment timer might be set to some other fixed time or might be variable and depend upon time of day, system loading, channel loading, channel quality, or other system parameters.

When the transmitted data packets 201–203 arrive at the communication unit 105, the communication unit 105 employs its receiver 117 to receive and decode the data packets 201–203. The communication unit 105 extracts the packet sequence numbers 217–219 from the data packets 201–203 and compares the lowest-valued packet sequence number (e.g., 217) to the present value of a receive tracking number maintained in the communication unit's database 121. The receive tracking number indicates the packet sequence number of the data packet that the communication unit 105 next expects to receive.

Figure 3:
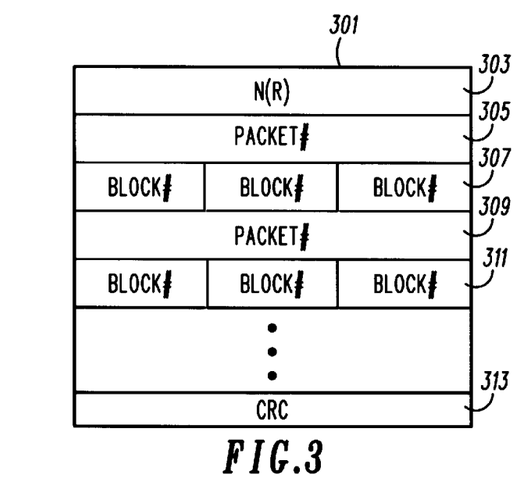
FIG. 3 illustrates an exemplary acknowledgment data packet in accordance with the present invention.

Upon receiving the data packets 201–203 and comparing the packet sequence numbers to the receive tracking number, the communication unit 105 employs its memory device 119 to generate an acknowledgment data packet 301. An exemplary acknowledgment packet 301 is depicted in FIG. 3. The acknowledgment packet 301 comprises one or more data blocks and preferably includes an updated receive tracking number 303, packet sequence numbers 305, 309 of data packets that have not been completely received, data block numbers or indicators 307, 311 of data blocks that have not been completely received, and a data integrity indicator (such as a known cyclic redundancy check (CRC) 313). The preferred acknowledgment packet includes data block indicators (e.g., bits) to facilitate the use of known SARQ protocols. Data block numbers or indicators 307, 311 are preferential only and do not form a necessary part of the present invention. The acknowledgment 301 depicted in FIG. 3 is in one-block form. In the alternative, a multiple block acknowledgment might be used, and may further include user data to be conveyed to the sending device and a known frame check sequence to be used to verify the integrity of the entire multiple block acknowledgment.

The updated receive tracking number 303 indicates the packet sequence number of a data packet in the group of data packets 201–203 that is earliest in sequence (i.e., of lowest value) and that was not completely received by the communication unit 105. For example, if the communication unit received all data blocks 205–207 of the data packet 201 having N(S)=1 in the above example, data blocks 209 and 211 of the data packet 202 having N(S)=2, and data block 213 of the data packet 203 having N(S)=3, the updated receive tracking number 303 would be N(R)=2 because data packet 202 had not been completely received (i.e., one data block 210 of data packet 202 had not been received). In this example, the acknowledgment packet 301 would include a receive tracking number 303 having a value of N(R)=2, a packet sequence number 305 (e.g., 2) indicating data packet 202, a data block number 307 indicating data block 210 (e.g., the number 2 would be used because data block 210 is the second data block of data packet 202), a packet sequence number 309 (e.g., 3) indicating data packet 203, and data block numbers 311 indicating data blocks 214 and 215 (e.g., the numbers 2 and 3 would be used because data blocks 214 and 215 are the second and third data blocks, respectively, of data packet 203).

Once the acknowledgment packet 301 is configured, the communication unit transmits a request for, and receives a grant of, a radio communication channel 125. The type of radio communication channel requested and allocated (e.g., time slot, frequency carrier, or orthogonal code) preferably corresponds to the type of radio channel 123 allocated to the base station 101 for transmission of the data packets 201–203. Upon receiving the channel grant, the communication unit 105 employs its transmitter 115 to encode the acknowledgment 301 and transmit the encoded acknowledgment to the base station 101 via the radio communication channel 125.

When, for some circumstance, the acknowledgment 301 does not reach the data controller 103 before the expiration time of the acknowledgment timer (e.g., when the packet data system 100 comprises an integrated voice and data system and receipt of the channel grant for communication channel 125 is delayed due to heavy prioritized voice traffic), the data controller 103 configures a group of data packets that includes at least one of the data packets of the unacknowledged group and conveys the new group of data packets to the base station 101 for transmission. The data controller 103 also stores a group ID together with the packet sequence numbers of the data packets in the new group in the database 113.

For example, referring to FIG. 4, assume the data controller 103 and base station 101 transmit a group of data packets consisting of data packets having sequence numbers 4–6. The data controller 103 stores the group ID (in this example, three to identify Group 3) and the packet sequence numbers (i.e., 4–6) in the storage area 400. When expiration of the Group 3 acknowledgment timer occurs prior to reception of an acknowledgment for Group 3, the data controller 103 configures a new group of data packets (e.g., Group 7) that at least includes data packets having packet sequence numbers 4–6. A description of how the data controller 103 determines which group a received acknowledgment corresponds to is provided below. As shown in FIG. 4, Group 7 consists of data packets having packet sequence numbers 4–6 and 17. The new group (Group 7) may be larger or smaller than the earlier transmitted group (Group 3) if, for example, more or less channel bandwidth, respectively, is available for transmission at the time the new group is configured or a higher or lower modulation rate, respectively, is selected for use in transmitting the data packets in the group. In addition, since a period of time has elapsed since transmission of the original group (Group 3), other groups of data packets may have been transmitted.

Thus, in some cases, data packets added to the new group (Group 7) that were not previously transmitted in the original group will have packet sequence numbers that do not immediately follow the highest packet sequence number of the original group. Upon configuring the new group, the data controller 103 stores the group ID and packet sequence numbers in the storage area 400 of the data base 113 and sends the new group of data packets to the base station 101 for transmission. Upon receiving confirmation of the transmission of the new group from the base station 101, the data controller starts the new group's (Group 7) acknowledgment timer.

When an acknowledgment 301 eventually arrives at the base station 101, the base station 101 employs its receiver 109 to receive and decode the acknowledgment 301. In the preferred embodiment, the base station 101 provides the acknowledgment 301 to the data controller 103. Upon receiving the acknowledgment 301, the data controller 103 employs its memory device 111 to determine which group of transmitted data packets the acknowledgment 301 corresponds to. The memory device 111 determines which group the acknowledgment corresponds to by examining, at a minimum, the receive tracking number 303 and, at a maximum, all the packet sequence numbers 305, 309 contained in the acknowledgment 301. The memory device 111 first compares the receive tracking number 303 with the stored packet sequence number of a data packet in the new group that was not in the original group (Group 3). In the above example, the memory device 111 compares the receive tracking number 303 with packet sequence number 17, which corresponds to the stored packet sequence number of a data packet that was originally transmitted in the new group (Group 7).

When the receive tracking number 303 equals the stored packet sequence number of a data packet that was originally transmitted in the new group, the memory device 111 determines that the acknowledgment 301 corresponds to the new group and examines the remainder of the acknowledgment (i.e., the packet sequence numbers 305, 309 and, when an SARQ protocol is used, the data block numbers 307, 311) to determine which packets were not completely received by the communication unit 105. Upon determining which data packets 305, 309 were not completely received, the memory device 111 generates a group of data packets that include the unreceived data blocks 307, 311 of the data packets 305, 309 identified in the acknowledgment 301 and, when the unreceived data blocks 307, 311 do not fully occupy an available amount of channel bandwidth, one or more additional, previously untransmitted data packets. The data controller 103 then provides the generated group to the base station 101 with instructions to transmit the group to the communication unit 105. If, at some time after receiving the acknowledgment 301 of the new group, the data controller 103 receives an acknowledgment that contains a receive tracking number corresponding to a stored packet sequence number that is common to both the new group (Group 7) and the original group (Group 3), the data controller 103 simply deletes such an acknowledgment because the data controller 103 knows that it has already responded to an acknowledgment for the more recent of the two groups (i.e., Group 7).

When the receive tracking number 303 of the acknowledgment 301 equals a packet sequence number (e.g., packet sequence number 5) that is common to the new group (i.e., Group 7) and the original group (i.e., Group 3), the memory device 111 cannot conclusively determine which group the acknowledgment 301 corresponds to. Thus, the memory device 111 presumes that the acknowledgment 301 corresponds to the original group and stores the acknowledgment in the database 113. The memory device 111 then waits to see if another acknowledgment corresponding to either the new group alone (e.g., when the receive tracking number equals the stored packet sequence number of a data packet originally transmitted in the new group) or both the new and the original groups (e.g., when the receive tracking number equals a stored packet sequence number that is common to both the new group and the original group) arrives prior to expiration of the acknowledgment timer of the new group. If an acknowledgment that meets the above criteria arrives prior to expiration of the new group's acknowledgment timer, the memory device 111 deletes the former acknowledgment and generates a group of data packets based on the latter acknowledgment. The data controller 103 then provides the generated group to the base station 101 with instructions to transmit the group to the communication unit 105.

In an alternative embodiment, the acknowledgment 301 may be arranged such that it does not include a separate receive tracking number 303 as depicted in FIG. 3. In such a case, the data controller 103 may use the packet sequence number 305 in the acknowledgment 301 that is lowest in value (i.e., was earliest in sequence of the group being acknowledged) as the effective receive tracking number for all the determinations above that were based on receive tracking number.

It should be noted that the techniques described above also occur in reverse—i.e., when the sending communication device is the communication unit 105 and the receiving communication device is the combination of the base station 101 and the data controller. In this case, the computer readable memory device 119 and the database 121 function in manners respectively similar to the computer readable memory device 111 and the database 113. It should further be noted that, in an alternative embodiment, the computer readable memory device 111 and the database 113 might be positioned within the base station 101 as memory device 127 and database 129. In this case, the base station 101 alone would perform the tasks executed by both the base station 101 and the data controller 103 in the above discussion. Consequently, the use of the term communication device herein is intended to encompass any device (e.g., base station 101 or communication unit 105) or combination of devices (e.g., base station 101 and data controller 103) that include a transmitter, a receiver, a computer readable memory device, and a database arranged, constructed, and programmed to perform the techniques described herein.

Moreover, although the method of the present invention was discussed above in the context of conveying data packets between infrastructure components (base station 101 and data controller 103) and mobile components (communication unit 105) of the system 100, the techniques of the present invention can also be applied to conveying data packets between two or more mobile communication devices or between two or more stationary communication devices coupled together via a wireless or wireline communication channel.

As described above, the present invention provides for the conveyance of groups of data packets during a packet data communication. In particular, the present invention permits reliable, yet resource efficient, transmission of data packets. By determining which of a plurality of transmitted groups of overlapping data packets a particular acknowledgment corresponds to, the present invention ensures that the correct data packets are re-transmitted by the sending communication device in response to the acknowledgment most recently transmitted (or at least transmitted within a desired acknowledgment time period) by the receiving communication device. In addition, by utilizing existing data in the acknowledgment to determine which of the groups the acknowledgment corresponds to, the present invention eliminates the need to include a group identifier in each acknowledgment and group transmission, thereby permitting higher data throughput in the system than if each acknowledgment and group transmission included a group identifier. By not including a group identifier, the present invention allows the bits that would be used in each acknowledgment and group transmission to identify the acknowledged group to be used to transmit user data, thereby allowing more efficient use of system channel resources.

Figure 5:
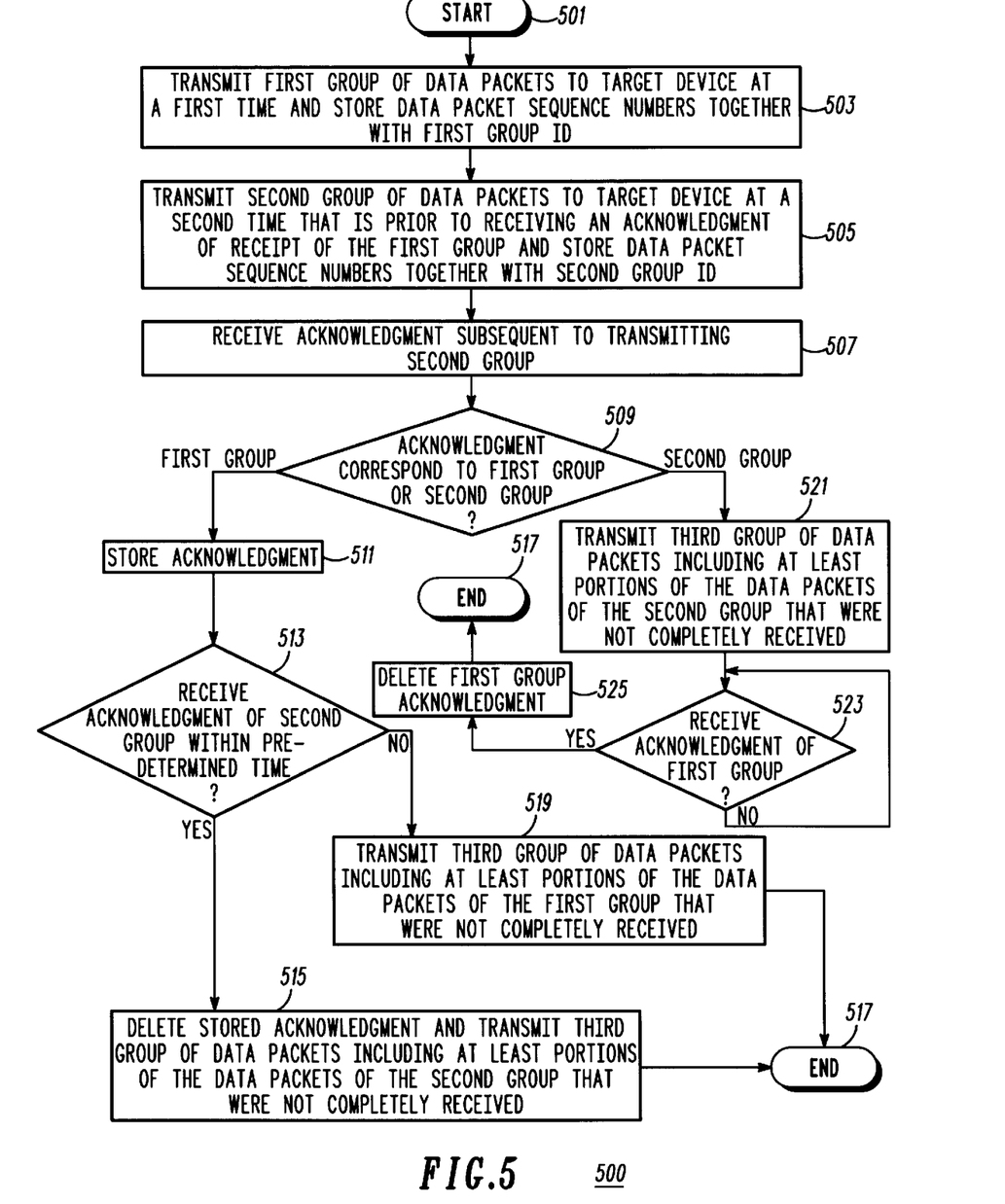
FIG. 5 illustrates a logic flow diagram of steps executed by a communication device to convey data packets in accordance with the present invention.

FIG. 5 illustrates a logic flow diagram 500 of steps executed by a communication device to convey data packets in accordance with the present invention. The logic flow begins 501 when the communication device transmits (503) a first group of data packets to a target communication device at a first time and stores, in a memory, a group ID for the first group together with the packet sequence numbers of the data packets in the first group. Prior to receiving an acknowledgment of receipt of the first group from the target device, the communication device transmits (505) a second group of data packets to the target device at a second time, wherein the second group includes at least some data packets of the first group, and stores, in memory, a group ID for the second group together with the packet sequence numbers of the data packets in the second group. In a preferred embodiment, the communication device transmits the second group when an acknowledgment of the first group has not been received within a predetermined time (e.g., five seconds) after transmission of the first group. Thus, in the preferred embodiment, the second time is at least five seconds after transmission of the first group. In addition, in the preferred embodiment, the second group includes all the data packets of the first group and, when the communication channel bandwidth allows, additional, previously untransmitted data packets. However, in certain circumstances, the second group may not include all the data packets of the first group. For example, when the modulation rate of the system is decreased (e.g., due to a high detected error rate) such that fewer packets can be transmitted in the communication channel bandwidth, the second group of packets will likely include fewer data packets than the first group.

At some time subsequent to transmitting both the first and second groups of data packets (and possibly as well as other unique groups of data packets), the communication device receives (507) an acknowledgment and determines (509) which group the acknowledgment corresponds to. As discussed above, this determination comprises comparing the receive tracking number of the acknowledgment with the packet sequence numbers stored for each group. When the receive tracking number equals the stored packet sequence number of a data packet originally transmitted in the second group, the communication device determines that the acknowledgment corresponds to the second group and generates a third group of data packets that preferably includes the data blocks of the data packets in the second group that were not completely received by the target device as indicated in the acknowledgment. In addition, depending upon the available communication channel bandwidth, the third group of data packets may be generated to further include previously, untransmitted data packets. Upon generating the third group, the communication device transmits (521) the third group of data packets to the target device. Subsequent to transmission of the third group, the communication device, upon receiving acknowledgments, determines (523) whether any received acknowledgment corresponds to the first group. When such an acknowledgment does correspond to the first group (e.g., when the acknowledgment acknowledges a data packet that was already acknowledged in the acknowledgment received at block 507), the communication device deletes (525) the acknowledgment and the logic flow ends (517).

Referring back to decision block 509, when the communication device determines that the receive tracking number equals a packet sequence number stored for both the first and the second groups, the communication device determines that the acknowledgment corresponds to the first group and stores (511) the acknowledgment. This determination is a presumption because, although the acknowledgment in this case might correspond equally to both groups, the acknowledgment of the first group is more likely to be transmitted before the acknowledgment of the second group. Upon storing the acknowledgment, the communication device determines (513) whether an acknowledgment of the second group has been received within a predetermined time after transmission of the second group. That is, the communication device determines whether an acknowledgment identifying one or more data packets of the second group (e.g., when not all data packets of the second group were completely received) or including a receive tracking number that indicates the packet sequence number of a data packet that is next in sequence after the highest-valued sequence number of a data packet in the second group (e.g., when all data packets of the second group were completely received) has been received prior to expiration of an acknowledgment timer for the second group.

When an acknowledgment of the second group is received within the predetermined time, the communication device deletes (515) the stored acknowledgment of the first group and transmits the aforementioned third group of data packets, thereby ending (517) the logic flow. However, when an acknowledgment of the second group is not received within the predetermined time, the communication device generates and transmits (519) a third group of data packets that preferably includes at least the data blocks of the data packets in the first group that were not completely received by the target device as indicated in the acknowledgment, thereby ending (517) the logic flow.

In a preferred embodiment, steps 509, 511, 513, 523, and 525 and portions of steps 503, 505 (e.g., storage of data packet sequence numbers together with group IDs and maintenance of acknowledgment timers), 515 (deletion of stored first group acknowledgment and generation of third group of data packets), 519, and 521 (e.g., generation of third group of data packets) of the above logic flow diagram 500 are performed by a computer program that is stored in a computer-readable memory of the communication device.

The present invention encompasses a method and apparatus for conveying data packets in a packet data communication system. With this invention, groups of data packets can be transmitted reliably, while substantially reducing retransmissions and, therefore, providing more efficient use of communication channel resources. By utilizing existing data in an acknowledgment packet to determine which of a plurality of transmitted groups of data packets the acknowledgment corresponds to, the present invention ensures that the correct data packets are retransmitted by a sending communication device in response to the acknowledgment without requiring a group identifier in each acknowledgment. By not including a group identifier, the present invention permits higher data throughput in the system than if each acknowledgment required such a group identifier. In addition, by selectively responding to acknowledgments (e.g., responding to an acknowledgment corresponding to a later-transmitted group and deleting an acknowledgment presumed to correspond to an earlier-transmitted group), the present invention reduces the number of retransmissions of data packets, thereby permitting more efficient use of communication channel resources, without jeopardizing reliability.

While the present invention has been particularly shown and described with reference to particular embodiments thereof, it will be understood by those skilled in the art that various changes in form and details may be made therein without departing from the spirit and scope of the present invention.

We claim:

1. A method for a first communication device to convey data packets to a second communication device in a packet data communication system, the method comprising the steps of:

transmitting a first group of data packets, wherein each data packet in the first group includes a respective packet sequence number;

storing the respective packet sequence number of each data packet in the first group together with a group identifier for the first group;

transmitting, prior to receiving an acknowledgment of the first group from the second communication device, a second group of data packets, wherein the second group includes at least some data packets of the first group and wherein each data packet in the second group includes a respective packet sequence number;

storing the respective packet sequence number of each data packet in the second group together with a group identifier for the second group;

receiving an acknowledgment of receipt of at least one of the first group and the second group to produce a received acknowledgment, wherein the acknowledgment includes at least a receive tracking number and wherein the receive tracking number indicates a packet sequence number of a data packet of a respective one of the first group and the second group that is earliest in sequence in the respective group and that was not completely received by the second communication device;

determining which group of data packets of the first group and the second group that the received acknowledgment corresponds to based at least on the receive tracking number to produce a determined group; and transmitting a third group of data packets based on the determined group, wherein the third group includes at least a portion of a data packet of the determined group that is earliest in sequence in the determined group and that was not completely received by the second communication device.

2. The method of claim 1, wherein the step of transmitting the third group comprises the steps of:

when the determined group is the first group, storing the received acknowledgment; and when an acknowledgment of the second group is not received within a predetermined time after transmission of the second group, transmitting the third group, wherein the third group includes at least a portion of the data packet of the first group that is earliest in sequence in the first group and that was not completely received by the second communication device.

3. The method of claim 2, wherein the step of transmitting the third group further comprises the steps of:

when an acknowledgment of the second group is received within a predetermined time after transmission of the second group, deleting the acknowledgment of the first group; and transmitting the third group, wherein the third group includes at least a portion of the data packet of the second group that is earliest in sequence in the second group and that was not completely received by the second communication device.

4. The method of claim 1, wherein the step of transmitting the third group comprises the steps of:

when the determined group is the second group, transmitting the third group, wherein the third group includes at least a portion of the data packet of the second group that is earliest in sequence in the second group and that was not completely received by the second communication device; and upon receiving an acknowledgment of the first group, deleting the acknowledgment of the first group.

5. The method of claim 1, wherein the received acknowledgment further comprises a packet sequence number of each data packet that was not completely received by the second communication device.

6. The method of claim 5, wherein the step of transmitting the third group comprises the step of transmitting at least a portion of each data packet in the determined group that was not completely received by the second communication device.

7. The method of claim 6, wherein the step of transmitting the third group further comprises the step of transmitting at least one data packet not previously transmitted in the determined group.

8. The method of claim 1, wherein the receive tracking number comprises the packet sequence number of the data packet of the determined group that is earliest in sequence and that was not completely received by the second communication device.

9. A communication device in a packet data communication system, the communication device comprising:

a transmitter that, at a first time, transmits a first group of data packets to a target communication device and, at a second time, transmits a second group of data packets to the target communication device, wherein each data packet of the first group and each data packet of the second group includes a respective packet sequence number and wherein the second group includes at least some data packets of the first group;

a receiver that receives an acknowledgment of receipt of at least one of the first group and the second group to produce a received acknowledgment, wherein the acknowledgment includes at least a receive tracking number and wherein the receive tracking number indicates a packet sequence number of a data packet of a respective one of the first group and the second group that is earliest in sequence in the respective group and that was not completely received by the target communication device; and a computer readable memory device, coupled to the transmitter and the receiver, that has stored therein a computer program that, when executed, performs the following functions:

stores in a database the respective packet sequence number of each data packet in the first group together with a group identifier for the first group and the respective packet sequence number of each data packet in the second group together with a group identifier for the second group;

determined which group of data packets of the first group and the second group that the received acknowledgment corresponds to based at least on the receive tracking number to produce a determined group;

generates a third group of data packets based on the determined group, wherein the third group includes at least a portion of a data packet of the determined group that is earliest in sequence in the determined group and that was not completely received by the second communication device; and instructs the transmitter to transmit the third group of data packets to the target communication device.

10. The communication device of claim 9, wherein the communication device comprises a base station.

11. The communication device of claim 10, wherein the communication device further comprises a data controller.

12. The communication device of claim 9, wherein the communication device comprises a mobile or portable two-way radio device.

* * * * *

UNITED STATES PATENT AND TRADEMARK OFFICE
CERTIFICATE OF CORRECTION

PATENT NO. : 5,872,777
DATED : February 16, 1999
INVENTOR(S) : Brailean et al.

It is certified that error appears in the above-identified patent and that said Letters Patent is hereby corrected as shown below:

Column 14, line 7 reads "determined" should be --determines--.

Signed and Sealed this

Seventh Day of September, 1999

Attest:

Q. TODD DICKINSON

*Attesting Officer*   *Acting Commissioner of Patents and Trademarks*